Sept. 18, 1962  J. K. MARTIN  3,054,345
DECORATING APPARATUS FOR CERAMIC FLATWARE
Filed May 19, 1958  9 Sheets-Sheet 1

FIG 1.

INVENTOR
JOHN K. MARTIN
BY Kenon & Palmer
ATTORNEYS

Sept. 18, 1962  J. K. MARTIN  3,054,345
DECORATING APPARATUS FOR CERAMIC FLATWARE
Filed May 19, 1958  9 Sheets-Sheet 3

FIG. 3

INVENTOR
JOHN K. MARTIN

BY Kemon & Palmer

ATTORNEYS

Sept. 18, 1962 J. K. MARTIN 3,054,345
DECORATING APPARATUS FOR CERAMIC FLATWARE
Filed May 19, 1958 9 Sheets-Sheet 5

INVENTOR
JOHN K. MARTIN

BY Kamon & Palmer

ATTORNEYS

Sept. 18, 1962  J. K. MARTIN  3,054,345
DECORATING APPARATUS FOR CERAMIC FLATWARE
Filed May 19, 1958  9 Sheets-Sheet 6

INVENTOR
JOHN K MARTIN

BY *Kenyon & Palmer*

ATTORNEYS

Sept. 18, 1962 J. K. MARTIN 3,054,345
DECORATING APPARATUS FOR CERAMIC FLATWARE
Filed May 19, 1958 9 Sheets-Sheet 7

INVENTOR
JOHN K. MARTIN

BY *Kenyon & Palmer*

ATTORNEYS

Sept. 18, 1962  J. K. MARTIN  3,054,345
DECORATING APPARATUS FOR CERAMIC FLATWARE
Filed May 19, 1958  9 Sheets-Sheet 8

INVENTOR
JOHN K. MARTIN

BY Kenon + Palmer

ATTORNEYS

Sept. 18, 1962  J. K. MARTIN  3,054,345
DECORATING APPARATUS FOR CERAMIC FLATWARE
Filed May 19, 1958  9 Sheets-Sheet 9

INVENTOR
JOHN K. MARTIN

BY Kenyon + Palmer

ATTORNEYS

United States Patent Office 3,054,345
Patented Sept. 18, 1962

3,054,345
DECORATING APPARATUS FOR CERAMIC FLATWARE
John K. Martin, Monterrey, Mexico, assignor to Fabricacion de Maquinas, S.A., Monterrey, Mexico, a corporation of Mexico
Filed May 19, 1958, Ser. No. 736,074
6 Claims. (Cl. 101—123)

This invention relates to decorating machines, and more particularly, to decorating machines for ceramic ware, such as dinner plates and the like, in which the screen and stencil method is employed.

While the broad idea of screen and stencil decoration for ware of this type has been known for quite some time, the problems of designing a machine for assembly line production are many. For example, it has long been a problem to design such a machine which, with only minor adjustments, would handle ware of various shapes and sizes. By shapes, what is meant is cross-sectional shapes of the ware, as well as the outline configuration of the ware, as shown, for example, in a plan view from either the top or bottom.

Objects

The principal objects of the present invention may be enumerated as follows:

(1) To provide a machine for automatically decorating ceramic ware surface that are not symmetrical with respect to a principal axis.

(2) To provide a machine for the automatic decoration of ceramic ware, in which the surfaces to be decorated are not continuous.

(3) To provide a machine in accordance with the foregoing objects, which will adapt itself to a wide variety of sizes of ware to be decorated.

(4) To provide a machine in accordance with the foregoing objects in which there are built-in safety factors, both for the operator and for the machine itself.

Other objects will be apparent from the following, detailed description read in conjunction with the attached sheets of drawing in which.

General Description

In general, the apparatus of the present invention involves three basic and related pieces of apparatus which function together in predetermined relationship. To facilitate a detailed description of the machine, the initial description will be more of a general one directed primarily to the functioning of the machine and its three basic components.

In general, the basic components are a workpiece supporting mechanism, a stencil and squeegee type decorating apparatus, and power driven linkage which operates to synchronize the movements of the first two components. All the basic components are enclosed within a housing or base member.

Figure 1:
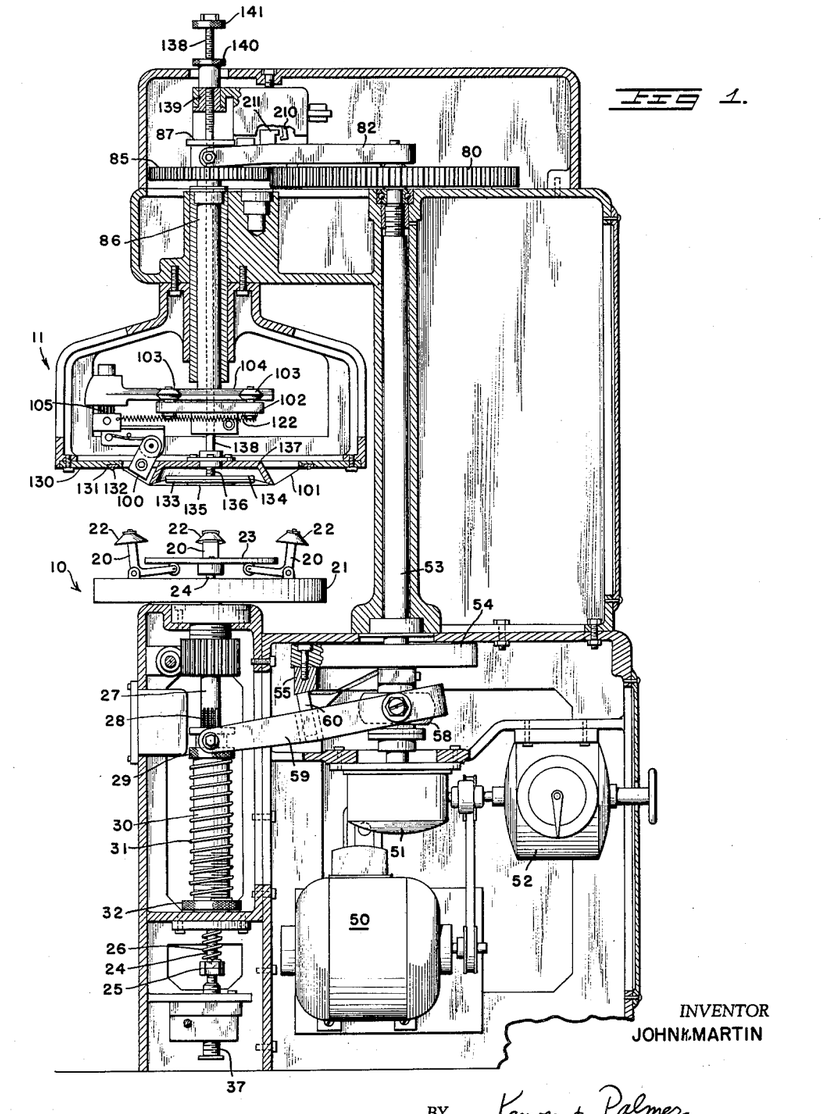
FIGURE 1 is a side elevation of the entire machine partly in section and with the working parts in inoperative position.
Figure 2:
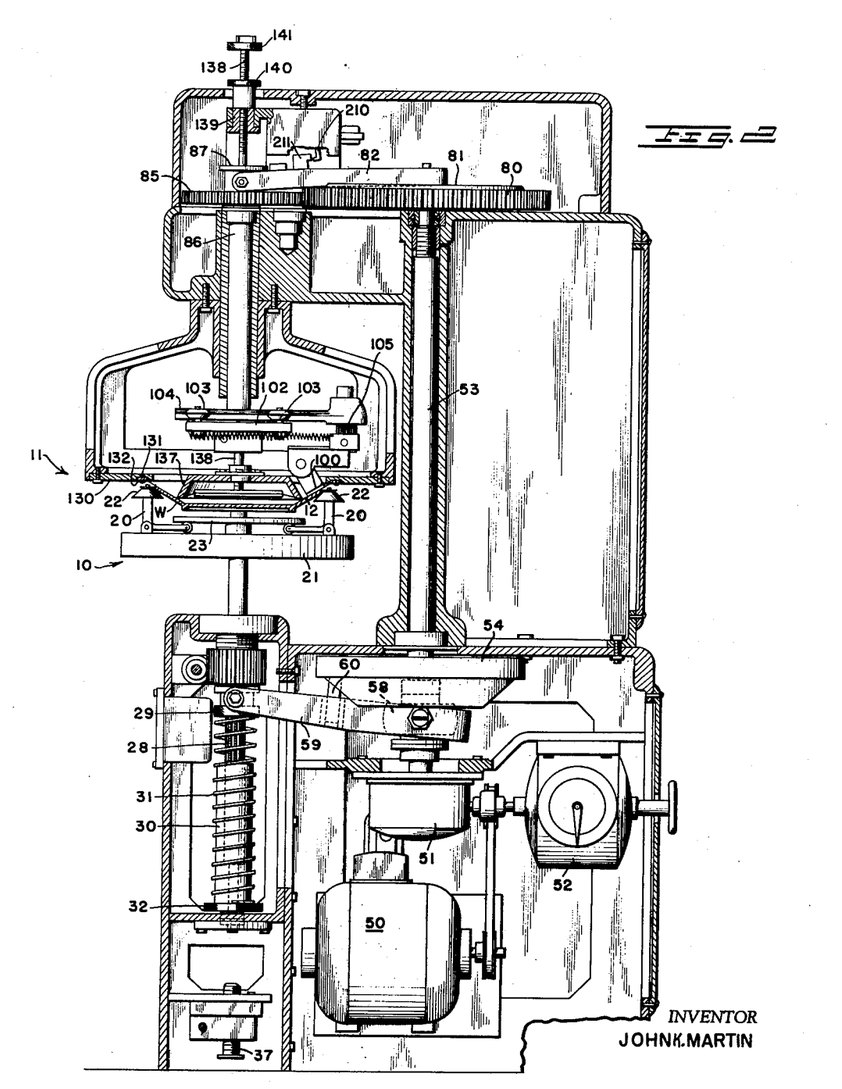
FIG. 2 is identical to FIG. 1 but with the parts in decorating position.

Referring first to FIG. 1, the work supporting portion of the machine is designated generally by the reference numeral 10. The decorating portion of the machine, which is located immediately above the workpiece supporting portion, is designated in general by the reference numeral 11. The remainder of the apparatus shown in FIG. 1 comprises mainly the prime mover and necessary mechanical linkage interconnecting the decorating portion and the workpiece supporting portion, all connecting linkage being actuated primarily by the prime mover. The basic operation of the machine may be briefly described in connection with FIGS. 1 and 2. The machine must be manually loaded and unloaded, and consequently, the first step is for an operator to place a workpiece upon the work supporting means 10. It will be understood, of course, that the machine runs continuously, and that the operator must time his loading and unloading operations with the movements of the machine. Once the operator has placed a workpiece upon the work support 10, the work support rises to place the workpiece in contact with the screen 12 as shown in FIG. 2. A squeegee then rotates on that side of the screen which is opposite from the workpiece and forces the coloring material through the screen onto the workpiece. Following a complete revolution of the squeegee on the screen, the workpiece support again descends to its original starting position shown in FIG. 1, at which point the operator removes the piece which has been decorated and replaces it with a new workpiece. With the basic operation of the machine set forth as above, a more detailed description of the three basic components is in order, and will begin with an analysis of the workpiece support and its movements relative to the decorating head.

The Workpiece Support

Figure 3:
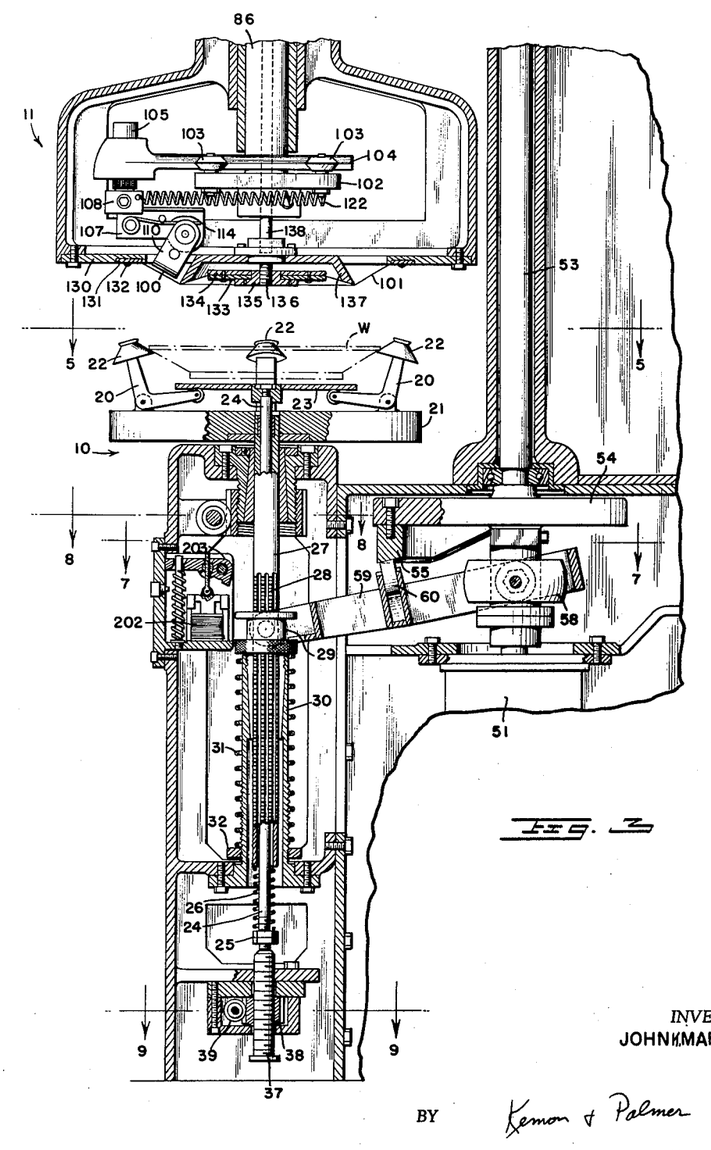
FIG. 3 is an enlarged side elevation partially sectioned showing more details of the work supporting assembly and decorating head with parts in inoperative position.

Referring now to FIGS. 3, 5, 6, 7, 8 and 9, and first of all to FIG. 3, the major components of the workpiece support include a plurality of L-shaped arms 20, each of which is pivotally supported at the jointure of the two legs of the L, to a table member 21. The outer ends of each of the arms 20 includes a rotatably mounted work supporting head 22 which is frusto-conically shaped throughout its major portion, but at its uppermost surface, includes a member larger in diameter than the upper surface of the frusto-conical portion, and thus defines a shoulder which, when the machine is in operation, is in positive engagement with the workpiece. A circular disc-like member overlies the inner portions of the arms 20 and is identified in the drawings with the reference numeral 23. It will be readily apparent that the position of the disc-like member 23 with respect to the table 21, determines the radial spacing between each of the work supporting heads 22. The disc-like member 23 is suitably attached to the upper end of a rod member 24. Referring to FIG. 3, the lower end of the rod member 24 may be threaded to receive a pair of nuts 25 which form a shoulder. A helical spring member 26 is positioned concentrically with respect to the rod 24 and the lower end of the spring bears against the nuts 25. The upper end of the spring 26 bears against another member to be described hereinafter, but the net result is that the rod 24 is urged downwardly by the spring 26 biasing the heads 22 toward each other. The downward movement of the rod 24 is limited by an adjusting mechanism which will be described hereinafter.

Turning again to the table member 21, and still referring to FIG. 3, it will be seen that this table is carried at the upper end of a hollow shaft 27. The latter shaft surrounds the pull rod 24 throughout a major portion of its length. The helical spring 26 bears at its upper end against the lower extremity of the hollow shaft 27. From the structure thus far described, it will be seen that the zero or starting position for vertical movements of the table 21 is therefore dependent upon the position of the hollow shaft 27. For reasons which will be apparent hereinafter, it is desirable to make the zero position of the table adjustable. The adjusting mechanism is also shown in FIG. 3.

It will be seen that a portion of the hollow shaft 27 is splined at 28, and further that the splined portion is also threaded. The threaded portion of the shaft threader engages with an adjusting nut 29. The nut 29 is therefore manually rotated to correctly adjust the zero position of table 21 before operations are commenced. The nut 29 may be conveniently prevented from rotation during operation of the machine by means of a spring pressed ball urged into one of the spaces between adjacent splines with sufficient force to prevent rotation of the nut 29 during operation of the machine, but with insufficient force to prevent manual rotation of this nut when it is desired to turn it.

Figure 8:
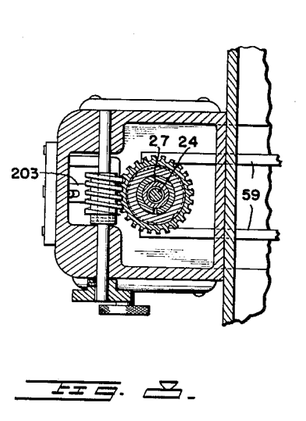
FIG. 8 is a section on lines 8—8 of FIG. 3.
Figure 9:
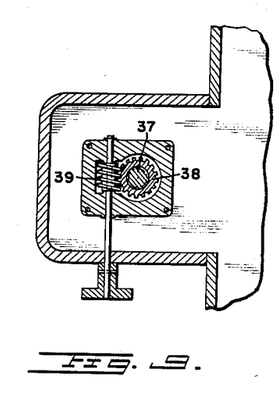
FIG. 9 is a section on lines 9—9 of FIG. 3.

The upper end of the shaft 27 is supported in suitable bearings which may be adjustable to provide a wear compensating adjustment as shown in FIGS. 3 and 8. A hollow supporting member 30 surrounds the lower portion of the hollow shaft 27, and also forms a support for a tapered bushing which is internally splined to receive the splined portion of shaft 27. From the description thus far, it will be seen that the entire assembly, which includes the shaft 27, the table 21 and the work supporting arms 20 is mounted for vertical reciprocatory movement in the upper and lower shaft supports. Motive power for moving the assembly vertically upwardly is provided by a helical spring 31. This spring surrounds the support 30 in concentric fashion and its lower end rests upon an adjusting nut 32, which is threaded to the exterior of the support 30. The upper end of the spring 31 engages the under-surface of the nut 29. This spring, of course, is under compression in the position shown in FIG. 3, and if the work supporting assembly were free to move in a vertical position without restraint, the spring 31 would move the assembly in such direction.

Figure 5:
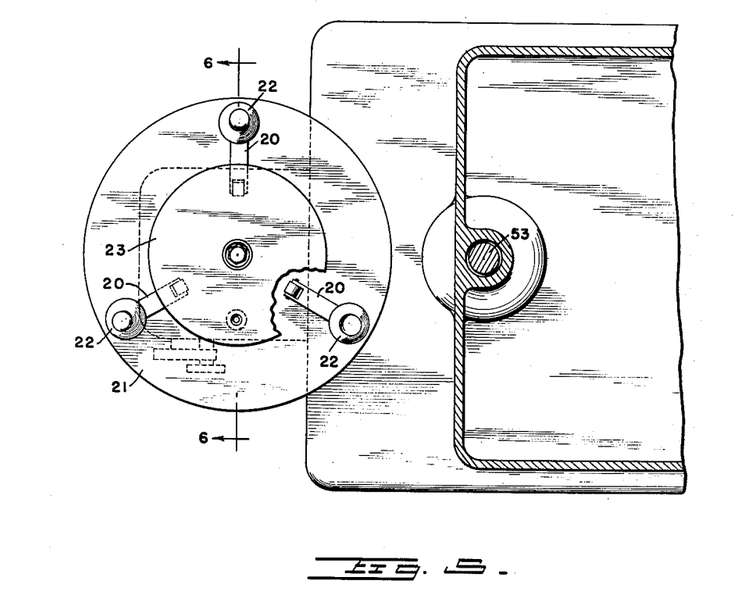
FIG. 5 is a section along lines 5—5 of FIG. 3.
Figure 6:
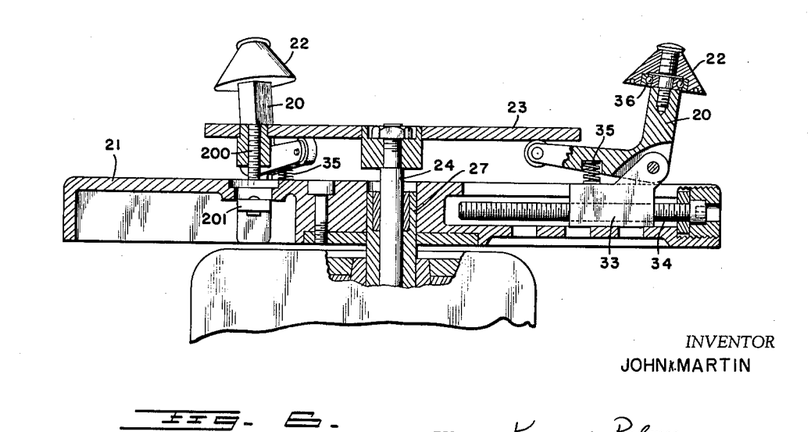
FIG 6 is a view along lines 6—6 of FIG. 5.

Referring now to FIGS. 5 and 6 these show in detail the mounting of the work supporting arms 20 upon the table 21. Each of the arms 20 is pivotally connected to a slide member 33 which is adjustable radially of the table 21 by means of an adjusting screw 34 which threadedly engages a bore in the slide 33. Also shown in this figure is a biasing means for urging the horizontal arm of the member 20 upwardly into engagement with the under-surface of the disc-like member 23. Such biasing means is indicated by the spring 35. FIG. 6 shows in detail the mounting of the actual workpiece engaging member 22 on the arm 20. The connection between these two members includes a ball bearing member 36 which insures that the members 22 are freely rotatable with respect to the support 20.

Referring again to FIGS. 3 and 9, and particularly to the lower portion thereof, there is shown an adjusting means engageable with the lower end of the pull rod 24, which adjustment is for the purpose of initially positioning the radial spacing between the work supporting members 22. Although this adjusting means could take any one of a number of forms, it is shown in these figures as including a jack screw 37 which threadedly engages the inner surface of a pinion 38. The latter member is in engagement with a worm wheel 39 which is rotatable exteriorly of the machine by means of the shaft and hand wheel assembly shown most clearly in FIG. 9.

FIG. 3 shows the position assumed by a workpiece W when it is initially loaded onto the workpiece supporting members 22. When the entire assembly is released for vertical upward movement in a manner which will be described hereinafter, the helical spring 26 positioned at the lower end of the pull rod 24 is effective to urge the disc-like member 23 at the opposite end of the pull rod downwardly, thereby forcing the work supporting arms 20 radially inwardly so that the workpiece will be engaged at three spaced points of its periphery by the shoulders formed at the top of the frusto-conical section of the members 22. This is sufficient to hold the workpiece against rotation during the time that the actual design is being placed on the upper surface thereof by the decorating head which will be described hereinafter. Similarly, when the work supporting assembly returns to its zero position, the pull rod 24 abuts on the upper surface of the jack screw 37, while the hollow shaft 27 continues to move downwardly by a small amount. This is sufficient, therefore, to return the members 20 to the position shown in FIGS. 3 and 6, and allows an operator to remove the workpiece W and to replace it with one to be decorated on the next cycle of the machine.

*Actuating Apparatus for the Workpiece Support*

Figure 7:
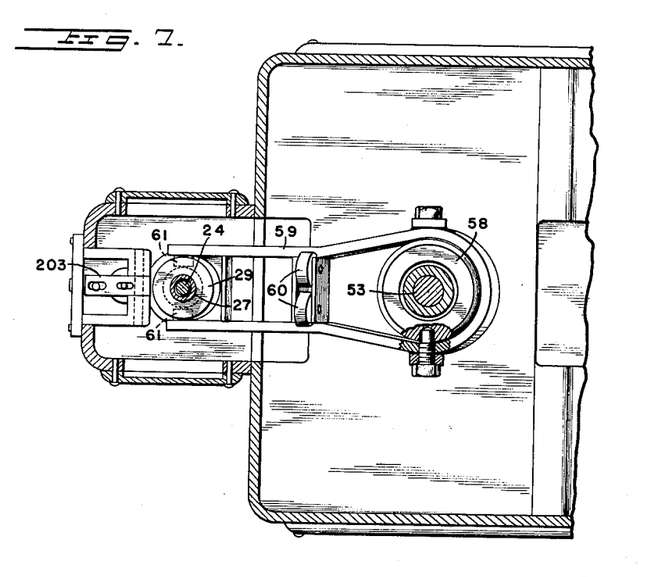
FIG. 7 is a section on lines 7—7 of FIG. 3.

As indicated in the foregoing description, the helical spring 31 is the sole source of motive power for moving the work supporting assembly vertically upwardly to place the workpiece W in contact with the screen or stencil through which the decorating material is applied. Control of the upward and downward movements of the workpiece support is logically therefore the next portion of the apparatus to be described in detail. For a description of this portion of the apparatus, reference will be made to FIGS. 1, 2, 3, 4 and 7. In the lower portion of FIGS. 1 and 2, there is shown an electric motor 50 which through a belt drive and gear box 51, together with a speed adjusting control assembly 52, furnishes the motive power for rotating the main shaft 53. It is from the rotation of this shaft that all operations such as decorating and movements of the workpiece supporting assembly derive their movement and are thereby synchronized. There are upper and lower cam assemblies actuated by the shaft 53. The lower cam assembly which controls movements of the work support, will be described first. At the lower end of the shaft 53 there is positioned and attached so as to be rotated by the shaft 53, a disc or wheel member 54. It will be noted that cam members 55 are bolted to the undersurface of the disc 54. The shape of these cam members is most clearly shown in FIGS. 3 and 4. Immediately below the disc 54 there is a ball bearing member 58 mounted on the lower end of shaft 53 in such manner that the outer race is free to turn with respect to the shaft 53. A cam follower arm 59, shown most clearly in FIGS. 3 and 7, is gimbal mounted to the outer race of the ball bearing assembly 58. Approximately midway of the longitudinal axis of the arm 59, there is positioned a pair of roller members 60 which engage the under-surfaces of the cam members 55. As shown in FIG. 7, these roller members may be housed in a box-like structure which provides an oil reservoir for automatic lubrication of the cam surfaces and roller followers during operation of the machine.

Referring again to FIG. 7, it will be seen that the entire cam follower arm assembly is forked, and at the outer ends of the arms there are provided a pair of bearing members 61.

Returning now to FIGS. 1–4, for an overall view of the relative position of the parts thus far described, it will be seen that the bearing members 61 carried by the outer ends of the cam follower arm 59 engage within the collared portion of the nut 29. It will be recalled that the nut 29 is threaded on its inner bore to engage the threaded splined portion of the shaft 27, but this nut is not free to turn on the shaft 27, in view of the spring pressed ball assembly which anchors it against rotation during normal operation of the machine. For practical purposes of the ensuing description, we may assume that the nut 29 is rigidly attached to the shaft 27.

Figure 4:
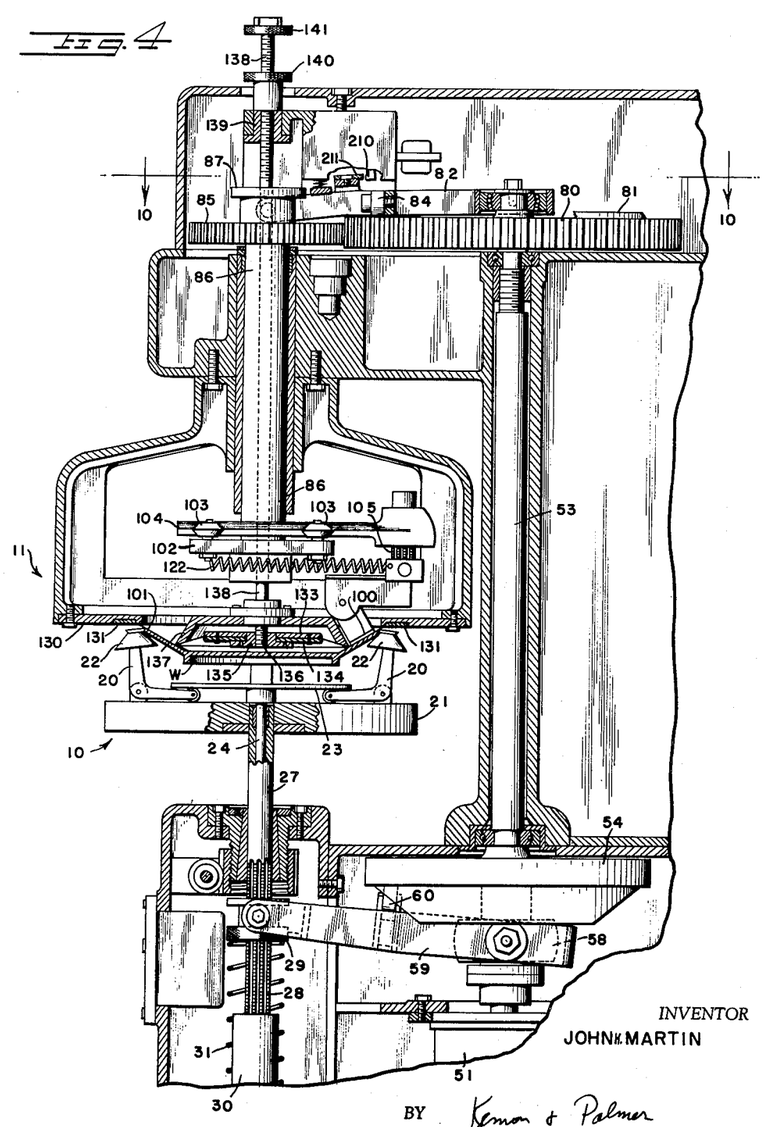
FIG. 4 is similar to FIG. 3 but showing the parts in operative position.

It will be apparent that with the disc 54 and the cam surfaces which depend therefrom in the position shown in FIGS. 1 and 3, the work support assembly is held in its lowermost position. If we now assume rotation of the shaft 53 however, as the cam arm follower 59 follows the surface of the cams 55, it will move rather suddenly to a more horizontal position as shown in FIGS. 2 and 4. This being the only means restraining upward movement of the workpiece supporting assembly, the latter will move upwardly under the influence of force exerted by the spring 31 as the cam follower arm 59 rides down the inclined surfaces of the cams 55. It will be further apparent that one complete rotation of the shaft 53 results in the workpiece table support moving from the position shown in FIGS. 1 and 3 to a position adjacent the decorating head, as shown in FIGS. 2 and 4, and a return to the position shown in FIGS. 1 and 3. Therefore, each cycle of the machine corresponds to one complete rotation of the main shaft 53.

Of course, the main shaft 53 is suitably supported in bearing members at its opposite ends and is therefore free to rotate under the driving force from the prime mover 50.

At the upper end of the shaft 53, there is a second cam and cam follower assembly which is similar in many respects to the lower assembly. The purpose of the upper cam and cam follower assembly is to control movements of the actual decorating portion of the apparatus which will be described hereinafter. Since both the upper and lower cam follower assemblies derive their movement from rotation of the shaft 53, the latter serves as a synchronizing element to correlate and correctly time the movements of the workpiece supporing assembly with the movements of the decorating apparatus.

*Actuating Apparatus for the Decorating Head*

Figure 10:
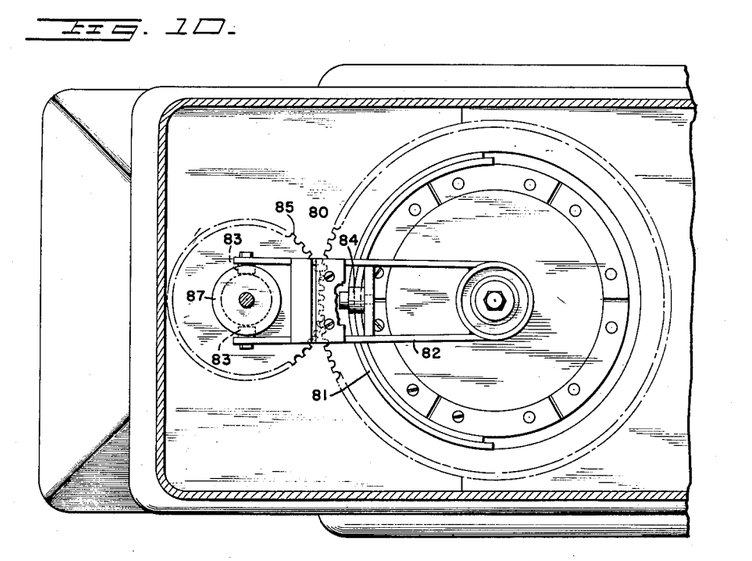
FIG. 10 is a section on lines 10—10 of FIG. 4.
Figure 11:
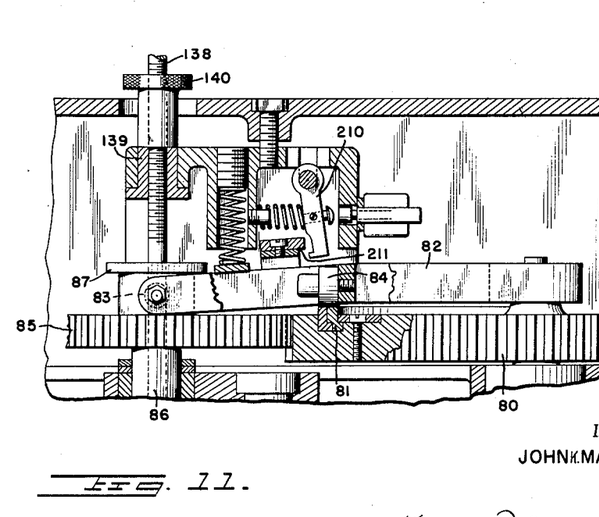
FIG. 11 is an enlarged side elevation in section of the upper cam and cam follower assembly.

Referring now to FIGS. 4, 10 and 11, it will be seen that there is a large pinion 80 attached to the upper end of shaft 53. On the upper surface of this pinion is clamped a cam member or members 81 in a manner quite similar to that shown at the lower end of the shaft 53. The cam follower arm 82 is bifurcated in a manner very similar to the cam follower arm 59 shown in FIG. 7. At its outer extremities, the arm 82 includes a pair of inwardly projecting bearing members 83. At an intermediate point of the length of the arm 82 there is positioned a cam follower roller member identified by the reference numeral 84. The latter member, of course, is positioned to ride upon the cam surfaces 81 on the upper radial face of the pinion 80. It will be seen that the pinion 80 driven by the shaft 53 meshes with a second pinion 85 which is rigidly attached to a shaft 86 at the upper end thereof. Projecting upwardly from the upper radial face of the pinion 85, there is a hub member 87. The inwardly projecting bearing members 83 at the end of the cam follower arm are received within the collar formed by the hub member 87. From the description thus far, it will be apparent that rotation of the pinion 80 causes vertical reciprocatory movements of the cam follower arm 82, the outer end of which engages with the hub 87 on the pinion 85. Thus, it will be seen that not only does rotation of the pinion 80 result in rotation of the shaft 86, but further, that the shaft 86 has vertical reciprocatory movement corresponding to the movements of the outer end of the cam follower 82. The shaft 86, of course, is suitably journaled in its housing, as shown for example in FIG. 4 for both rotary and reciprocal movement. A top plan view of the upper cam and follower assembly is shown in FIG. 10.

By reference to FIGS. 1 to 4, it will be seen that the actual decorating apparatus is driven by the movements of the shaft 86. Consequently, this portion of the apparatus will be next described.

*The Squeegee Support*

Figure 12:
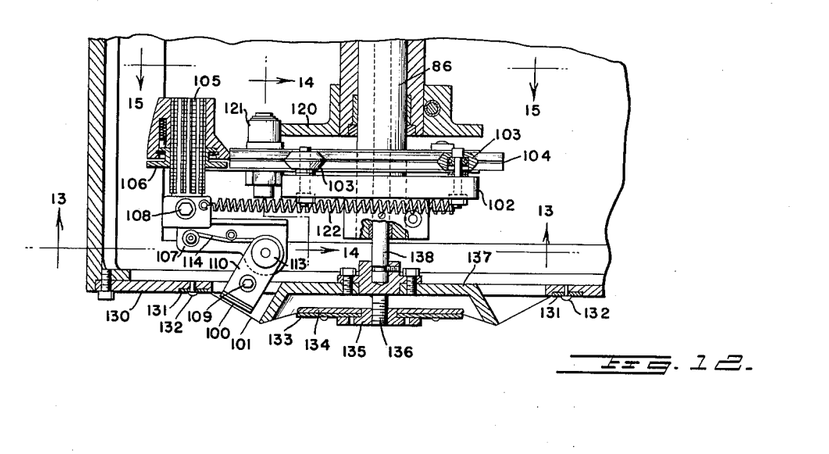
FIG. 12 is an enlarged side elevation in section of the squeegee support and stencil screen.

Referring particularly to FIG. 12, a squeegee member 100 which is used to force coloring matter through the stencil screen shown at 101, is adjustably supported with respect to shaft 86. The entire squeegee supporting assembly shown in FIG. 12 is attached to the lower end of shaft 86 and therefore rotates with the shaft. Vertical reciprocating movements of the shaft 86, serve to determine during which sectors of the circle described by the rotating squeegee, it is in contact with the stencil screen 101. By proper selection of the upper cam assembly 81, therefore, it is possible to select any of a plurality of portions of the ware upon which decoration is to be placed.

Figure 13:
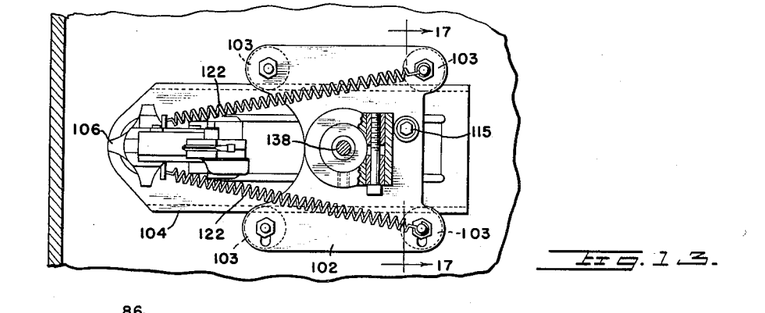
FIG. 13 is a section on lines 13—13 of FIG. 12.
Figure 14:
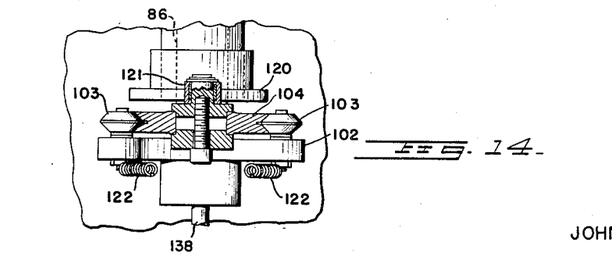
FIG. 14 is a section on lines 14—14 of FIG. 12.
Figure 15:
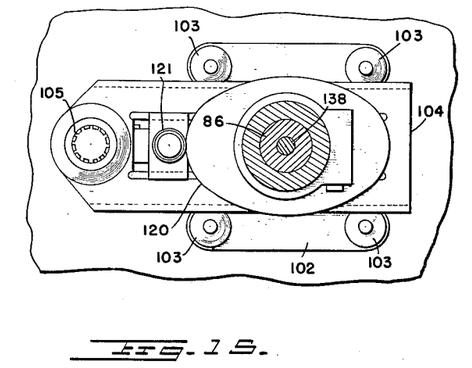
FIG. 15 is a section on lines 15—15 of FIG. 12.
Figures 16, 17:
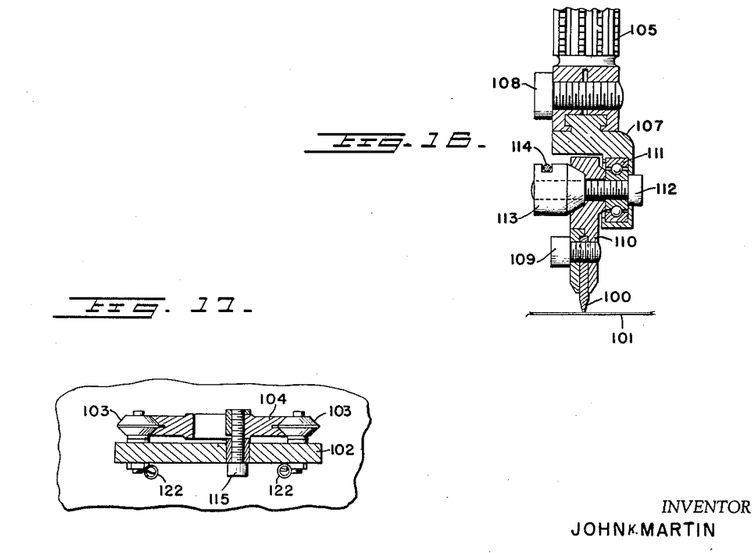
FIG. 16 is an enlarged sectional view of the squeezer support.
FIG. 17 is a section on lines 17—17 of FIG. 13.

As shown in plan view in FIG. 13, that portion of the decorating assembly which is attached to the lower end of shaft 86 comprises a spider member 102. At the opposite four corners of this member, there are rotatably supported four pulley members 103 which are shown perhaps most clearly in FIGS. 12, 14 and 17. The next structural member in the line of the squeegee support is a carriage member 104 which is shown in plan view in FIGS. 13 and 15. This member is substantially rectangular in its general outline and on the longer pair of its opposed surfaces includes grooves which conform to and receive the pulley members 103. As will be noted in FIG. 13, one pair of the pulley members is adjustable with respect to the other pair in order that there be a snug fit between the carriage member 104 and the spider member 102. At one extremity of the carriage 104, there is mounted a splined shaft 105 (FIGS. 12 and 15). The vertical position of this shaft is made adjustable through provision of a star nut 106. The splines on the shaft, of course, mate with splined surfaces in the member 104, to prevent rotation of the shaft 105 with respect thereto. At the lower end of this shaft, a bifurcation is formed, as shown in FIG. 16. The outer extremities of the two arms are shaped so as to receive a dove-tail grooved member 107. As shown in FIGS. 12 and 16, the position of the member 107 with respect to the splined shaft 105 is therefore adjustable and any desired position may be held by tightening of the bolt 108 in order to clamp the member 107 rigidly between the two arms at the base of the shaft 105. Since the squeegee member 100 is mounted on an arm which depends from the member 107, the bolt 108 forms one means of adjusting the radial position of the squeegee with respect to the axis of its rotation, which, of course, is the center of the shaft 86.

The squeegee 100 is rigidly clamped by means of a bolt 109 to an arm 110. The latter member is pivotally mounted on the carriage member 107, as shown in sectional view in FIG. 16. The pivotal support of the arm 110 on the carriage member 107 includes an outwardly flared opening in the member 110, a ball bearing assembly 111, a bolt 112, and a tapered bushing 113, the taper of the latter member conforming to the outward flare of the opening in the arm 110. The bolt 112 extends through the inner race of the bearing assembly, and threadedly engages the tapered bushing 113. One surface of the bushing 113 includes a groove with a plane bottom surface. A wire or leaf spring member 114, shown most clearly in FIG. 12, is positioned to lie within the groove in the tapered bushing, and thereby resiliently position the squeegee carrying arm 110. The angle at which the squeegee carrying arm extends from the carriage 107 is therefore adjustable by rotation of the tapered bushing 113. Such adjustment is necessary in order that the working surface of the squeegee proper may be inclined as nearly as possible to the average angle of the edge of the workpiece to be decorated. Stated in another way, all plateware does not have the same angle between the edge portions and the base thereof, and in order to properly decorate the edge portions, it is necessary that the squeegee be as nearly parallel as possible to the surface to be decorated.

A second means for adjusting the radial position of the squeegee from the center of its axis of rotation lies in the movable relationship previously described between the spider 102 and the carriage 104. As shown most clearly in FIG. 17, these two members may be secured together by means of a bolt 115. As long as the workpiece to be decorated is truly circular, the carriage 104 and the spider 102 may always be rigidly attached to each other. In the event, however, that the ware to be decorated is other than circular, then a different arrangement is necessary, If, for example, the ware to be decorated is oval in shape rather than circular, then the path of travel of the squeegee member must conform to the oval shape of the workpiece. Since the squeegee is supported by the carriage member 104, and further, since this member is movable relative to the spider member 102, it is therefore possible to achieve a reciprocatory movement of the carriage member 104 during rotation of both members 104 and 102. As long as the bolt 115 is loosened so that the carriage is free to move with respect to the spider, the aforesaid compound movement is possible.

Still referring to FIG. 12, the lower end of the sleeve in which the shaft 86 is housed may have attached rigidly thereto a cam surface 120. This is shown in plan view in FIG. 15. Rotatably mounted upon the carriage 104 is a cam follower 121. Although it will be appreciated that the cam 120 may have any desired configuration, FIG. 15, for illustrative purposes, shows the shape to be oval. To provide for continuous contact between the cam follower and the cam, a pair of springs 122, shown most clearly in FIGS. 12 and 13, are connected between spaced points on the spider 102 and that end of the carriage 104 which supports the cam follower. It will be apparent, therefore, that as the spider is rotated by the shaft 86, that the carriage 104 will rotate with it, but will also reciprocate, due to engagement of the cam follower 121 with the stationary cam member 120. In the event of radical departure from the circular shaped ware, it may be necessary to alter the shape of the opening in cover plate 130 and also the outer configuration of the bell member 137 to allow the squeegee to follow in circular pattern.

The basic moving parts of the machine have been covered in the foregoing description. The stencil screen itself, although not a moving part of the machine, is nevertheless, one of the more essential parts and the means for supporting and adjusting the position of the screen will now be described. The details of the mounting adjusting apparatus for the screen are most clearly shown in FIG. 12, wherein the screen is identified by the reference numeral 101. On the under surface of the housing for the actual decorating apparatus, there is secured a plate member 130. An annular groove is formed in the under surface of the plate member 130 and an annular ring 131 is clamped into the annular groove by means of bolts 132. It is this clamping assembly which rigidly holds the outer periphery of the stencil screen. The centermost portion of the stencil screen is held between a pair of flat discs or washers 133 and 134 which may be held together by screw-threaded fasteners. The last mentioned discs or washers are rotatably supported on a hub member 135 which is rigidly secured at the lower end of a short shaft 136. The upper end of shaft 136 is rigidly secured to a bell-shaped member 137. Still referring to FIG. 12, it will be noted that the screen is held therefor at its inner edge by the discs or washers 133 and 134, and at its outer edge by the member 131 clamped into the groove in the member 130. Intermediate these two points of support, the screen engages the lowermost edges of the bell-shaped member 137. With the apparatus as thus far described, it will be apparent that rotation of the nut 135 relative to its shaft 136 will result in increasing or decreasing the tension in the stencil screen. Mere adjustment of the screen tension, however, is insufficient to permit the decoration of differently shaped workpieces. The angle of that portion of the screen which will be in engagement with the workpiece must also be made variable. The desired angularity adjustment is provided for in the apparatus of the present invention by vertical movements of the bell-shaped member 137. As shown in FIG. 12, this member is rigidly carried on the end of a shaft 138, which extends through the center of the hollow shaft 86.

Referring now to FIG. 1 or FIG. 2, it will be seen that the shaft 138 extends completely through the hollow shaft 86, pinion 85, and protrudes outwardly through the top housing of the machine. Between the pinion 85 and the top of the housing, the shaft 138 is threaded and is in threaded engagement with a bushing member 139 which is carried by a supporting bridge rigidly attached to the housing for the entire apparatus. A jam nut 140, also threaded to engage with the shaft 138, may be tightened to exert a pressure on the bushing 139, and thereby prevent rotation of the shaft 138 during operation of the machine. To adjust the angularity of the screen, therefore, by moving the bell-shaped member in a vertical plane, it is only necessary to loosen the jam nut 140 and then rotate the shaft itself by means of a hand wheel 141 which is rigidly secured to the upper end of the shaft. When the desired angularity has been achieved, the jam nut 140 is again tightened to maintain the adjustment.

Referring again to FIG. 12, it will be seen that the bell-shaped member 137 is rotatably attached to the base of the shaft 138. Rotation of the shaft to effect the desired angularity adjustment, therefore, does not result in rotation of the bell-shaped member.

The foregoing description completes the details of the basic operating mechanism of the present invention. In addition, there are a number of safety features incorporated in the application which are significant and which will be described hereinafter.

*Safety Features*

The stencil screens which are used in machines of this type are relatively expensive and it is important to prevent damage to these screens during operation of the machine. Unless provided for, the screen could easily become damaged by any one of the following occurrences:

(1) Improper loading of the workpiece on the three fingers. For example, the operator may place the workpiece properly on two of the fingers, but with the under side of the plate resting on top of the third finger.

(2) When a plate is broken during the loading operation.

(3) When no plate is loaded at all.

(4) When a plate is too small for the setting of the machine is loaded onto the workpiece support.

When any of these four conditions occur, it is both desirable and necessary to prevent contact between any portion of the workpiece, or the workpiece support with any portion of the screen or its support. At the same time, it is also desirable to prevent contact between the squeegee member and the screen under these same conditions. In order that the foregoing objects be achieved, provision is made to prevent the rise of the workpiece assembly beyond a predetermined point, and further to prevent contact between the squeegee and the stencil screen, the two operations occurring simultaneously.

Referring first to FIG. 6, it will be seen that the disc member 23 carries a screw-threaded stud 200, which stud extends below the surface of the plate member 23. Mounted on the table 21, in alignment with the stud 200, is an electrical switch member 201. The latter switch is actuated whenever the stud 200 comes into contact therewith.

Referring now to FIG. 3, there is shown a solenoid 202 which is connected to be energized by the switch 201. When energized, the solenoid 202 is operative to effect movement of a pivoted latch member 203 from the position shown in FIG. 3 to a position which projects it directly into the upward path of travel of the collared nut 29. Whenever the solenoid is energized, therefore, the workpiece assembly can rise no further than allowed by contact of the collared nut with the latch member 203.

The additional safety apparatus which must operate simultaneously with that just described is shown most clearly in FIG. 11. Positioned immediately above the upper cam follower arm 82 is a pivoted latch member 210. An abutment with an overhanging lip or shoulder which is rigidly attached to the cam follower arm 82 is identified in this figure by the reference numeral 211. The latch member 210 is conveniently actuated by means of a solenoid which is connected in parallel with the solenoid 202 just previously described with reference to FIG. 3. The two, therefore, are energized simultaneously, and the effect of energization of the upper solenoid is to move the pivotally mounted latch member 210 to the left in order that its lower hooked end engages beneath the shoulder on the abutment 211. The effect of such engagement is to prevent the cam follower arm 82 from lowering the squeegee supporting assembly to a point which would allow contact between the squeegee and the stencil screen. Normally, of course, when the low point of the upper cam is positioned beneath the cam follower arm, the squeegee supporting assembly would lower under its own weight to a point placing the squeegee in contact with the stencil screen.

With the two pieces of apparatus just described, it will be apparent that whenever the two solenoids are actuated, the squeegee is prevented from contacting the stencil screen and the workpiece supporting assembly is simultaneously prevented from rising to a point which would place any part of it in contact with the stencil screen or its support.

Referring again to FIG. 6 and keeping in mind the action of the disc member 23 when the workpiece support assembly begins to rise, it will be apparent that whenever any of the enumerated four conditions occur, the disc 23 is free to move downwardly with respect to the table 21 under the influence of the spring 26 shown in FIG. 1. This is so and the disc 23 more closely approaches the table 21 because the work supporting fingers under any of these four conditions are free to move radially inwardly. The adjustment of the stud 200 is simply set to actuate the switch 201 whenever this occurs.

Another safety feature which is inherent in the operation of the present apparatus and which has been mentioned hereinbefore, relates to the means by which the workpiece support is given vertical movement. The point is that such movement is permissive rather than positive, and the force exerted by the helical spring 31 is sufficient only to insure good contact between the workpiece and the stencil screen, but insufficient to cause injury to an operator's head or other portion of an operator's body in the event that it become caught between the decorating head and the workpiece support assembly.

One remaining feature which is shown most clearly in FIG. 4 of the attached drawings is also worth noting. Provision is made for changing the gear ratio between the shafts 86 and 53. Assuming for illustrative purposes that the ratio between the pinions 85 and 80 is 1 to 2, then the shaft 86, which drives the decorating head, will make two complete revolutions for each revolution of the main shaft 53. With this gearing relationship, therefore, for every rotation of the main shaft 53, there will be one-half of the time of said one rotation for loading and unloading and the other half for decorating. This ratio, however, may be changed, and there is specific provision for such change.

In FIG. 4, there is shown an opening in the head which allows the mounting of an idle gear between the main pinion and the decorating shaft pinion. As an example, an idle gear could be inserted, together with a smaller pinion gear 85, so that the gear ratio between the two shafts becomes 3 to 1 instead of 2 to 1. If this were the case, there would then be two-thirds of the cycle, as defined by one roation of the main shaft available for loading and unloading, and one-third of the cycle for decorating. This means, of course, that the actual decorating portion of the cycle is considerably less, but the time for loading and unloading is considerably more. However, this results in a higher output per unit time for overall machine operation.

From the foregoing description, it will be apparent to those skilled in the art that there is herein shown and described a new and versatile plateware decorating machine. It is adaptable to a wide variety of shapes to be decorated and is substantially foolproof in operation. While a preferred embodiment has been herein shown and described, applicant claims the benefit of a full range of equivalents within the scope of the appended claims.

I claim:

1. Ceramic flatware decorating apparatus comprising in combination: a base; work piece engaging and supporting means mounted in said base for vertical reciprocatory movement with respect thereto; a decorating head assembly supported by said base in alignment with said workpiece engaging and supporting means and spaced vertically therefrom said assembly including a stencil screen and a squeegee rotatable in contact therewith to force coloring matter therethrough to effect decoration of the workpiece; positively driven means interconnecting said workpiece engaging and supporting means and squeegee for elevating the workpiece engaging and supporting means to place the work in engagement with the stencil screen and to rotate the squeegee in timed relation to movement of the workpiece engaging and supporting means; and a pair of latch members simultaneoulsy operable to prevent contact between the workpiece engaging and supporting means and the screen and between the squeegee and the screen whenever a workpiece is broken or improperly loaded.

2. In a ceramic flatware decorating apparatus, a work support assembly comprising: a table; a plurality of radially adjustable slides carried by said table; a plurality of L-shaped members, one pivotally mounted on each of said slides, a pivoted axis extending through the jointure of the two legs of said L-shaped members, and the horizontal leg of each extending radially inwardly of said table and parallel to its associated slide; a plurality of generally conical workpiece engaging members, one rotatably mounted at the extremity of each of the vertical arms of said L-shaped members, and each conical member terminating in a shoulder for gripping the workpiece; spring means positioned between each said slide and the horizontal leg of its associated L-shaped member; a disk member overlying said table and the horizontal legs of said L-shaped members; and means for moving said disc toward said table to cause the work engaging members to move toward each other to grip a workpiece supported thereon.

3. Ceramic flatware decorating apparatus comprising in combination: a base; a hollow shaft mounted for vertical reciprocating movement in said base; a table rigidly attached to the upper end of said shaft; a pull rod extending axially through said hollow shaft and said table; a disc rigidly attached to the upper end of said rod so as to partially overlie said table; a plurality of L-shaped members each pivotally connected to said table at the juncture of the two legs of the L, one leg of each extending radially inwardly of the table so that its inner end is received between the disc and the table and the other leg of the L extending generally upwardly from said table; first biasing means urging said L-shaped members about their pivotal connection to said table to urge the horizontal legs of each against the underside of said disc; work engaging means carried by the upper legs of said L-shaped members; spring means biasing said pull rod downwardly in said hollow shaft, whereby the L-shaped members are moved about their pivots inwardly toward each other against said first biasing means to engage a workpiece resting on said work engaging means; a decorating head assembly supported by said base in alignment with said hollow shaft and spaced vertically therefrom, said assembly including a stencil screen and a squeegee rotatable in contact therewith to force coloring matter therethrough to effect decoration of the work; and positively driven constant velocity gearing means interconnecting said hollow shaft and squeegee for elevating the work engaging means to place the work in contact with the stencil screen and to rotate the squeegee in timed relation to the movements of the work support.

4. The combination defined by claim 3 and including a main shaft mounted for rotation in said base; means for positively rotating said shaft; a second shaft mounted for rotation in said decorating head, and carrying said squeegee at its lower end; constant velocity gearing means interconnecting said shafts; spring means biasing said work supporting means toward said decorating head; and cam and cam follower means carried by the lower end of said means shaft and connected to said work supporting means for permitting upward movement of said work supporting means under the influence of said spring means in timed relation to the rotation of said main shaft.

5. In a ceramic flatware decorating apparatus of the stencil screen and rotary squeegee type, a decorating head assembly comprising: a hollow shaft vertically disposed within said head assembly and rotatably and reciprocably mounted therein; a spider member rigidly attached to the lower end of said hollow shaft; a carriage surrounding said shaft, slidably mounted on said spider member and supporting the squeegee at one end thereof; a cam member rigidly mounted with respect to said shaft; a cam follower mounted on said carriage to engage said cam; means biasing said carriage to maintain engagement between said cam member and cam follower; and means for rotating said shaft; whereby rotation of said shaft causes rotation of said squeegee in a path dependent upon the shape of said cam member.

6. In a decorating apparatus for ceramic flatware of the stencil screen and rotary squeegee type, means for elevating a workpiece from a loading position into decorating position in contact with the stencil screen comprising: workpiece supporting means mounted for vertical reciprocating movement in alignment with the stencil screen; spring means normally biasing said workpiece supporting means vertically upwardly toward the screen; and cam means operatively connected to said workpiece supporting means for positively lowering said workpiece supporting means away from the screen against the force exerted by said spring biasing means in one position of said cam means and for permitting said spring means to elevate said workpiece supporting means into contact with the screen in another position of said cam means.

References Cited in the file of this patent

UNITED STATES PATENTS

| | | |
|---|---|---|
| 2,426,391 | Emerson | Aug. 26, 1947 |
| 2,588,620 | Dubuit | Mar. 11, 1952 |
| 2,605,700 | Martin | Aug. 5, 1952 |
| 2,612,106 | Ryckman | Sept. 30, 1952 |
| 2,664,066 | Martin | Dec. 29, 1953 |
| 2,692,552 | Conkle | Oct. 26, 1954 |